Patented Nov. 11, 1952

2,617,726

UNITED STATES PATENT OFFICE 2,617,726

LIGHT-SENSITIVE DIAZOTYPE MATERIALS

Franciscus Antonius Hubertus Kessels, Venlo, Netherlands, assignor to Chemische Fabriek L. van der Grinten, Venlo, Netherlands, a company of the Netherlands No Drawing. Application August 1, 1947, Serial No. 765,655. In the Netherlands July 10, 1947

13 Claims. (Cl. 95—6)

The use of betanaphthol as an azo coupling component in the diazotype process is known, and equally the use of some other betanaphthol components like 2,3-dihydroxynaphthalene (Netherlands Patent 47,840), some special betahydroxynaphthoic acid derivatives like its anilides (Netherlands Patent 28,421), its hydroxyalkylamides (Netherlands Patent 55,598) and its aminoalkylamides (Netherlands Patent 52,177), betanaphtholdisulfonic acid 3,6 and 2,7-dihydroxynaphthalene.

A number of the betanaphthol components have an insufficient solubility in water for their application in the practice of the diazotype process.

It now has been found that by providing combinations or compositions of such insufficiently soluble betanaphthol components with one or more xanthines, diazotype materials can be obtained in many cases which have desirable photographic qualities together with a sufficient solubility in water for practical use in diazotype processes. By the application of these combinations it now becomes possible to use the said betanaphthol components in the conventional manner in the diazotype process. Without the use of the xanthines this would involve difficulties and complications (the coating or developing would require e. g. the use of alcoholic solutions, or one or more precoatings, or the application of the betanaphthol component in the form of an emulsion). According to this invention the said betanaphthol components can be applied in the same manner as e. g. the azo coupling components well known to be useful in the diazotype process, viz: phloroglucinol, resorcinol, betanaphthol disulfonic acid-3.6, and the like. The invention thus enlarges the range of selection of effective betanaphthol components, and this is desirable on account of the constantly increasing demand for variety in the quality and shade of diazotype copies.

Amongst the xanthines tested for the present purpose, caffeine appeared to possess a particularly high activity.

Preferably the invention is practiced by employing amides of betahydroxy naphthoic acid (2.3-hydroxy naphthoic acid) as the azo coupling components. This class of betanaphthol coupling components includes many species having desirable properties, but most of them have been difficult to use on account of their low solubility in water. It has now been found that such components when used according to this invention can be dissolved in water to concentrations sufficient for the purpose of the diazotype process.

In general the problem of solubility has been the greatest in connection with the use of difficulty soluble betanaphthol components in the so-called two-component process, in which the light-sensitive diazo compound (generally a para-aminobenzene diazonium salt, which may contain alkyl or other substituents at the benzene nucleus or the amino group or at both) and the azo coupling component have to be present simultaneously in the acid medium of the light-sensitive mixture. This more particularly is the case with respect to those betanaphthol components which are but slightly soluble in an acid medium. In some instances the betanaphthol components yield difficulty soluble products with the diazo compounds. The constitution of such products has not been fully determined, but it has been found that they also become better soluble in the presence of a xanthine than without it.

The present invention has been found effective in the two-component diazotype process not only with respect to the solubility problem, but also in that the xanthine added in many instances, enhances the keeping quality of the two-component diazotype materials (probably by retardation of premature coupling). Moreover, the diazotype papers made up with a betanaphthol type coupling component and a xanthine, particularly caffeine, have been found to yield an improved (more complete) formation of the dyestuff when developed in moist ammonia fumes.

The xanthines to be used according to this invention naturally must not cause detrimental reactions with the other substances present and must have no other inconvenient properties.

Example 1

A solution is prepared consisting of:

2 grams 1-diazo-4-dimethylamino - 2 - methyl-benzene-sulfate,
2 grams citric acid,
1 gram thiourea, and
0.1 gram gum arabic in 100 cc. of water at 90° C. (solution A).

A second solution is prepared consisting of:

0.8 grams betanaphthol,
2 grams citric acid,
10 grams caffeine, in 100 cc. of water at 95° C. (solution B).

After cooling to 35° C. equal parts of solutions A and B are mixed. Base paper suitable for the diazotype process and having a weight of 110 gr. per square meter is coated with 12 gr. per square meter of the said mixture and dried. After exposure under a transparent drawing the print is developed in ammonia fumes. A violet-brown positive image is obtained. If caffeine had been omitted from solution B, the azo component would only have been dissolved to a very small extent and only a weak brown picture would have been obtained.

*Example 2*

A solution is prepared consisting of:

2.4 grams 1-diazo-4-monoethylamine-3-methyl-benzene-chloro-stannate,
1 gram citric acid, and
0.5 gram thiourea in 40 cc. of water at 90° C. (solution A)

A second solution is prepared consisting of:

0.1 gram gum arabic,
1 gram betahydroxy naphthoic acid amide,
0.3 gram acetyl acetic anilide, and
6 grams citric acid, in 60 cc. of water at 90° C. (solution B).

After cooling to 25° C. the solutions A and B are mixed and with this mixture base paper suitable for the diazotype process is coated in an amount of 12 gr. per square meter, after which the paper is dried. After exposure under a drawing the print is developed in ammonia fumes. A black positive image is obtained. Without the addition of caffeine to the above mentioned coating solution the betanaphthol component would only have been dissolved partly under the given circumstances, and only a yellow picture would have been obtained.

*Example 3*

A solution is prepared consisting of:

2.4 grams 1-diazo-4-dimethyl aminobenzene-zinc chloride double salt,
6 grams citric acid,
2 grams naphthalene trisulfonic acid 1.3.6-sodium salt,
3 grams thiourea, and
0.1 gram gum arabic in 40 cc. of water at 90° C. (solution A).

A second solution is prepared consisting of:

1 gram betahydroxy naphthoic acid-hydroxy-ethylamide, and
1 gram theophylline in 60 cc. of water at 90° C. (solution B).

After cooling to 25° C. the solution A and B are mixed and a quantity of 10 gr. per square meter of this mixture is coated on base paper for the diazotype process. After exposure under an original and development in ammonia fumes a blue-violet positive copy is obtained. By omitting theophylline from the above mentioned coating solution, but otherwise under the same conditions, a weaker picture would have been obtained. Theophylline can be replaced by an equivalent quantity of caffeine.

*Example 4*

A solution is prepared consisting of:

3 grams 1-diazo-4-diethylamino benzene-zinc chloride double salt,
2 grams citric acid,
2 grams thiourea, and
0.1 gram gum arabic in 100 cc. of water at 90° C. (solution A).

A second solution is prepared consisting of:

1.5 grams 2.3-dihydroxy naphthalene and
4 grams caffeine in 100 cc. of water at 90° C. (solution B).

After cooling to 25° C. equal parts of the solutions A and B are mixed. Base paper for the diazotype process is coated with this mixture in an amount of 10 gr. per square meter and then dried. After exposure under a transparent letter written only on one side, and subsequent development in ammonia fumes, a strong positive copy is obtained in a pure blue shade. If the above coating had been prepared without caffeine, but otherwise under the same conditions, a considerably weaker copy would have been obtained.

*Example 5*

A solution is prepared consisting of:

2.5 grams 1-diazo-4-diethylaminobenzene-chlorostannate,
5 grams citric acid,
2 grams thiourea, and
2 grams naphthalene trisulfonic acid-1.3.6 sodium salt in 100 cc. of water at 90° C. (solution A).

A second solution is prepared consisting of:

1 gram 2.3-dihydroxy-naphthalene and
1 gram theobromine in 100 cc. of water at 90° C. (solution B).

Base paper for the diazotype process is precoated with 10 gr. per square meter of the solution B and dried. Then it is again coated on the same surface with 10 gr. per square meter of solution A and dried again. After exposure under an original and development in ammonia fumes a greenish-blue picture is obtained. If the theobromine is omitted from solution B the betanaphthol component will have crystallized from the solution before the pre-coating can be done, and a weak picture will be obtained.

*Example 6*

A solution is prepared consisting of:

5 grams tartaric acid,
2 grams naphthalene trisulfonic acid-1.3.6-sodium salt,
3 grams thiourea,
3 grams caffeine, and
1.5 grams 2.7-dihydroxy naphthalene in 80 cc. of hot water. The mixture is heated until all the constituents are dissolved and it then is cooled down to 30° C. (solution A).

A second solution is prepared consisting of:

2 grams 1-diazo-4-dimethylamino-2-methylbenzene sulfate and
0.1 gram gelatin in 20 cc. of lukewarm water (solution B).

Both solutions A and B are mixed, and with the mixture base paper for the diazotype process is coated in an amount of 8 gr. per square meter and dried.

After exposure under an original and development in ammonia fumes, a strong brown-violet positive image is obtained. If in solution A the caffeine had been omitted, then upon cooling of this solution the betanaphthol component would have crystallized.

Upon mixing the solutions A and B in hot condition, but without caffeine in solution A, the mixture would precipitate a sticky brown-yellow substance. Under these circumstances coating would have been difficult if not impossible and only a weak copy would have been obtained.

A suitable and known way of preparing the beta hydroxy naphthoic acid amide used according to Example 2 consists in heating the ethyl ester of beta hydroxy naphthoic acid with an excess of alcoholic ammonia in an autoclave at 120° C. for about 8 hours, then cooling the reaction mixture so that the amide crystallizes, and then separating and drying the crystals. See Rosenberg, Berichte 25, page 3635.

What I claim is:

1. A diazotype material comprising a cellulosic support sheet carrying a dried light-sensitive layer containing in intimate association in an acid medium a light-sensitive para-aminobenzene diazonium salt, an azo coupling component of the formula

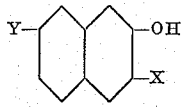

wherein substituent X is selected from the group consisting of hydrogen, a hydroxyl radical and alkyl- and hydroxyalkyl-substituted and unsubstituted —CONH₂ radicals and substituent Y is selected from the group consisting of hydrogen and a hydroxyl radical, and a xanthine that increases the water-solubility of said component.

2. A diazotype material as described in claim 1 in which X and Y are hydrogen.

3. A diazotype material comprising a cellulosic support sheet carrying a dried light-sensitive layer containing in intimate association in an acid medium a light-sensitive para-aminobenzene diazonium salt, caffeine, and an azo coupling component of the formula

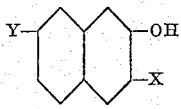

wherein substituent X is selected from the group consisting of hydrogen, a hydroxyl radical and alkyl- and hydroxyalkyl-substituted and unsubstituted —CONH₂ radicals and substituent Y is selected from the group consisting of hydrogen and a hydroxyl radical.

4. A diazotype material comprising a cellulosic support sheet carrying a dried light-sensitive layer containing in intimate association in an acid medium a light-sensitive para-aminobenzene diazonium salt, an amide of 2.3-hydroxy naphthoic acid as azo coupling component, and a xanthine that increases the water-solubility of said component.

5. A diazotype material comprising a cellulosic support sheet carrying a dried light-sensitive layer containing in intimate association in an acid medium a light-sensitive para-aminobenzene diazonium salt, the compound 2.3-hydroxy naphthoic acid amide as azo coupling component, and a xanthine that increases the water-solubility of said component.

6. A diazotype material comprising a cellulosic support sheet carrying a dried light-sensitive layer containing in intimate association in an acid medium a light-sensitive para-aminobenzene diazonium salt, and azo coupling component of the formula

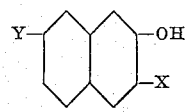

wherein substituent X is selected from the group consisting of hydrogen, a hydroxyl radical and alkyl-and-hydroxyalkyl-substituted and unsubstituted —CONH₂ radicals and substituent Y is selected from the group consisting of hydrogen and a hydroxyl radical, caffeine and a thio-compound.

7. A diazotype material comprising a cellulosic support sheet carrying a dried light-sensitive layer containing in intimate association in an acid medium a light-sensitive para-aminobenzene diazonium salt, a hydroxy alkyl amide of 2,3-hydroxy naphthoic acid as azo coupling component, and a xanthine that increases the water-solubility of said component.

8. A diazotype material comprising a cellulosic support sheet carrying a dried light-sensitive layer containing in intimate association in an acid medium a light-sensitive para-aminobenzene diazonium salt, 2,3-dihydroxy naphthalene as azo coupling component, and a xanthine that increases the water-solubility of said component.

9. A diazotype material comprising a cellulosic support sheet carrying a dried light-sensitive layer containing in intimate association in an acid medium a light-sensitive para-diazo-hydroxyethyl-aminobenzene compound, 2,3-dihydroxy naphthalene, caffeine, an acid stabilizer and a thio compound.

10. A diazotype material as described in claim 9 in which the acid stabilizer is citric acid.

11. A diazotype material as described in claim 9 in which the thio compound is thiourea.

12. A diazotype material as described in claim 9 in which said layer also contains a naphthalene trisulfonic acid.

13. A diazotype material as described in claim 9 in which said layer also contains a 2,3-dihydroxy naphthalene sulfonic acid.

FRANCISCUS ANTONIUS
HUBERTUS KESSELS.

REFERENCES CITED

The following references are of record in the file of this patent:

UNITED STATES PATENTS

| Number | Name | Date |
|---|---|---|
| 2,219,313 | Hoare | Oct. 29, 1940 |
| 2,233,038 | Sus et al. | Feb. 25, 1941 |
| 2,270,756 | Kern | Jan. 20, 1942 |
| 2,405,523 | Sease | Aug. 6, 1946 |
| 2,496,240 | Von Glahn | Jan. 31, 1950 |